Patented Mar. 18, 1924.

1,487,135

UNITED STATES PATENT OFFICE.

HARRY H. ALEXANDER, OF WESTFIELD, NEW JERSEY, ASSIGNOR TO AMERICAN SMELTING AND REFINING COMPANY, OF NEW YORK, N. Y., A CORPORATION OF NEW JERSEY.

RECOVERING OCCLUDED TIN.

No Drawing.     Application filed October 25, 1920.   Serial No. 419,476.

*To all whom it may concern:*

Be it known that I, HARRY H. ALEXANDER, a citizen of the United States, and resident of Westfield, in the county of Union and State of New Jersey, have invented certain new and useful Improvements in Recovering Occluded Tin, of which the following is a specification.

The invention relates in general to a process for recovering an alloy of tin and iron, and also occluded tin from the molten slag resulting from the smelting of stanniferous ore containing iron or ferrous compounds.

Among the objects of the invention are to obtain occluded metallic tin from molten tin bearing slag, to reduce any stannous oxide which may be present in the slag, and simultaneously to form an alloy of tin and iron.

More or less tin is always carried over by the slag resulting from the smelting of impure tin ores in a blast furnace. This percentage may be as low as two per cent to five per cent if the ore is smelted under suitable conditions according to the methods set forth in my copending applications, Serial Nos. 419,473, 419,474 and 419,475.

If the ore is smelted by other methods, such as are now in common use, however, the percentage of tin in the slag is much higher, and frequently the slag contains as much as ten per cent to fifteen per cent of the total tin content of the ore.

The present invention features the step of stirring into the molten slag a suitable reducing agent, such as carbonaceous material, usually in the form of fine coal, and also a suitable flux, such as limestone, and these agents are added in quantity and under conditions which will cause any stannous oxide present to be reduced, and an alloy of tin and iron to be formed, which may be separated subsequently from the slag.

The slag while still molten from the blast furnace and without appreciably cooling, is delivered to a settling furnace of standard construction and provided with a stirrer or other appropriate means for agitating the slag. The reducing and fluxing agents are stirred into the mass by the agitator or other means so as to become thoroughly disseminated through the mass and be brought into contact with the tin or tin compounds which may be present. The occluded metallic tin slowly settles out. Any stannous oxide that is present and the non-ferrous compounds of tin, such as silicates of tin, are reduced. During the operation a portion of the tin will combine with iron which is present in the slag under the conditions existing to form an iron tin alloy. The stirring of the charge may be continued for a varying period of five to ten hours depending upon the mass of the charge and the extent to which it is desired to clean the slag. Slags containing less than one per cent of tin can be obtained by regulating the period of stirring and the quantity of reducing material and fluxes that are added.

It is possible by this method not only to recover some of the occluded tin in the form of metallic tin, but also to recover practically all of the remaining tin in the form of an alloy with iron, which may be treated by the method disclosed in my co-pending application Serial No. 419,475. It will be understood that it is not necessary to granulate, sinter or re-smelt the slag before it is supplied to the settling vat, nor to recover the tin values, but on the contrary the slag is supplied directly in the molten state from the blast furnace into the slag settling furnace for final treatment.

Although I have shown and described and pointed out in the annexed claims certain novel features of my invention, it will be understood that various omissions, substitutions and changes in the several steps of the process and in its operation may be made by those skilled in the art without departing from the spirit of the invention.

Having thus described my invention, I claim:—

1. The process of recovering metallic tin from the slag produced in the blast furnace smelting of stanniferous ores containing iron, which consists in supplying the molten slag to a settling furnace, stirring the mass, adding a reducing agent thereto while maintaining the same in a molten condition whereby to reduce the tin and promote the formation of an iron tin alloy, and then separating said alloy from the slag.

2. The process of recovering metallic tin from the slag produced in the blast furnace smelting of stanniferous ores containing iron, which consists in supplying the molten slag without appreciably cooling the same to a settling furnace, slowly stirring the mass, adding a reducing agent and a flux thereto while maintaining the same in a molten condition thereby to reduce the tin and promote the formation of an iron tin alloy, and then separating said alloy from the slag.

3. In the art of extracting tin from materials which contain tin and iron, the process which consists in pouring the material while in a molten condition into a slag settling furnace, and permitting the occluded tin to settle out while stirring into the hot material a reducing agent to form an alloy of tin and iron and separating the alloy from the resulting slag.

Signed at New York city in the county of New York and State of New York this 13th day of Oct. A. D. 1920.

HARRY H. ALEXANDER.